US010297151B2

(12) United States Patent
Miller et al.

(10) Patent No.: US 10,297,151 B2
(45) Date of Patent: May 21, 2019

(54) TRAFFIC LIGHTS CONTROL FOR FUEL EFFICIENCY

(71) Applicant: Ford Global Technologies, LLC, Dearborn, MI (US)

(72) Inventors: Kenneth James Miller, Canton, MI (US); Daniel Mark Schaffer, Brighton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 150 days.

(21) Appl. No.: 15/155,157

(22) Filed: May 16, 2016

(65) Prior Publication Data

US 2017/0330456 A1 Nov. 16, 2017

(51) Int. Cl.

| | |
|---|---|
| ***G08G 1/00*** | (2006.01) |
| ***G08G 1/095*** | (2006.01) |
| ***G08G 1/01*** | (2006.01) |
| ***G08G 1/082*** | (2006.01) |
| ***G08G 1/09*** | (2006.01) |
| ***G08G 1/015*** | (2006.01) |
| ***G08G 1/04*** | (2006.01) |
| ***G08G 1/052*** | (2006.01) |
| ***G08G 1/08*** | (2006.01) |

(Continued)

(52) U.S. Cl.

CPC ............. *G08G 1/095* (2013.01); *G08G 1/015* (2013.01); *G08G 1/0112* (2013.01); *G08G 1/0116* (2013.01); *G08G 1/0133* (2013.01); *G08G 1/0145* (2013.01); *G08G 1/04* (2013.01); *G08G 1/052* (2013.01); *G08G 1/08* (2013.01); *G08G 1/081* (2013.01); *G08G 1/082* (2013.01); *G08G 1/091* (2013.01); *G08G 1/096716* (2013.01); *G08G 1/096725* (2013.01); *G08G 1/096758* (2013.01); *G08G 1/096775* (2013.01)

(58) Field of Classification Search

None

See application file for complete search history.

(56) References Cited

U.S. PATENT DOCUMENTS

| | | | | |
|---|---|---|---|---|
| 4,370,718 A | 1/1983 | Chasek | | |
| 7,953,546 B1 * | 5/2011 | Wall, III | ................ | G08G 1/081 340/905 |

(Continued)

FOREIGN PATENT DOCUMENTS

| | | | |
|---|---|---|---|
| FR | 2852724 A1 | 9/2004 | |
| JP | 2011248542 A | 12/2011 | |

(Continued)

OTHER PUBLICATIONS

Alesiani et al., "Optimal Speed Profile Trajectory Computation for Vehicle Approach At Intersection With Adaptive Traffic Control" (8 pages).

(Continued)

*Primary Examiner* — Truc M Do

(74) *Attorney, Agent, or Firm* — Frank A. MacKenzie; Bejin Bieneman PLC

(57) ABSTRACT

Data is received from each of a plurality of vehicles proximate to an intersection indicating a kinetic energy and a time to the intersection. An optimized timing of a traffic light is determined based on an aggregation of the kinetic energies and times to intersection. A timing of the traffic is modified according to the optimized timing.

18 Claims, 4 Drawing Sheets

(51) Int. Cl.
*G08G 1/081* (2006.01)
*G08G 1/0967* (2006.01)

(56) References Cited

U.S. PATENT DOCUMENTS

| | | | | |
|---|---|---|---|---|
| 8,078,379 | B2 * | 12/2011 | Lu | B60T 7/18 340/917 |
| 8,520,695 | B1 * | 8/2013 | Rubin | G08G 9/02 370/337 |
| 9,062,987 | B2 * | 6/2015 | Sato | G01C 21/3655 |
| 9,064,411 | B1 * | 6/2015 | Patton, Jr. | G08G 1/096 |
| 9,158,980 | B1 * | 10/2015 | Ferguson | G06K 9/00825 |
| 9,183,740 | B2 * | 11/2015 | Ota | B60W 30/188 |
| 9,633,560 | B1 * | 4/2017 | Gao | G08G 1/0145 |
| 9,761,136 | B2 * | 9/2017 | Tonguz | G08G 1/087 |
| 2001/0034575 | A1 * | 10/2001 | Takenaga | B60K 31/0008 701/96 |
| 2005/0140523 | A1 * | 6/2005 | Publicover | G08G 1/095 340/907 |
| 2006/0181433 | A1 * | 8/2006 | Wolterman | G08G 1/08 340/917 |
| 2006/0224294 | A1 * | 10/2006 | Kawazoe | B60W 30/143 701/93 |
| 2006/0225936 | A1 * | 10/2006 | Kawazoe | B60T 7/16 180/167 |
| 2006/0229792 | A1 * | 10/2006 | Kawazoe | B60W 30/16 701/93 |
| 2008/0012726 | A1 * | 1/2008 | Publicover | G08G 1/095 340/932 |
| 2008/0204277 | A1 * | 8/2008 | Sumner | G08G 1/08 340/910 |
| 2009/0256721 | A1 * | 10/2009 | Glatfelter | G08G 1/01 340/907 |
| 2010/0004839 | A1 * | 1/2010 | Yokoyama | G08G 1/052 701/70 |
| 2010/0070128 | A1 * | 3/2010 | Johnson | G08G 1/096783 701/31.4 |
| 2010/0073194 | A1 * | 3/2010 | Ghazarian | G08G 1/017 340/901 |
| 2010/0088002 | A1 * | 4/2010 | Welte | G01C 21/3469 701/99 |
| 2011/0018701 | A1 * | 1/2011 | Mizuno | G08G 1/07 340/438 |
| 2011/0130964 | A1 * | 6/2011 | Kitagawa | G01C 21/3697 701/301 |
| 2013/0110315 | A1 * | 5/2013 | Ogawa | G08G 1/096716 701/1 |
| 2013/0110316 | A1 * | 5/2013 | Ogawa | G08G 1/096716 701/1 |
| 2013/0194108 | A1 * | 8/2013 | Lapiotis | G08G 1/096716 340/905 |
| 2014/0118168 | A1 * | 5/2014 | Lee | G08G 1/096725 340/905 |
| 2014/0142818 | A1 | 5/2014 | Lee et al. | |
| 2014/0195138 | A1 * | 7/2014 | Stelzig | G08G 1/0116 701/119 |
| 2014/0278029 | A1 * | 9/2014 | Tonguz | G08G 1/087 701/117 |
| 2014/0309814 | A1 | 10/2014 | Ricci et al. | |
| 2015/0029039 | A1 * | 1/2015 | Mukaiyama | G08G 1/096716 340/905 |
| 2015/0154865 | A1 * | 6/2015 | Nakakuki | G08G 1/161 340/905 |
| 2015/0308837 | A1 * | 10/2015 | Cudak | G05D 1/0278 701/23 |
| 2016/0027301 | A1 | 1/2016 | Publicover | |
| 2016/0148507 | A1 * | 5/2016 | Pittman | G08G 1/07 340/917 |

FOREIGN PATENT DOCUMENTS

| | | | |
|---|---|---|---|
| WO | 2009126120 | A1 | 10/2009 |
| WO | WO 2013143621 | A1 | 10/2013 |
| WO | 2014094693 | A1 | 6/2014 |

OTHER PUBLICATIONS

UK Search Report dated Nov. 7, 2017 re: GB Appl. No. 1707236.4.

* cited by examiner

TRAFFIC LIGHTS CONTROL FOR FUEL EFFICIENCY

BACKGROUND

Traffic lights may cause vehicles to decelerate and accelerate depending on a status of the traffic light. Deceleration, acceleration, and idling of vehicles at or near traffic lights can increase vehicle energy consumption.

DETAILED DESCRIPTION

Introduction

Figure 1:
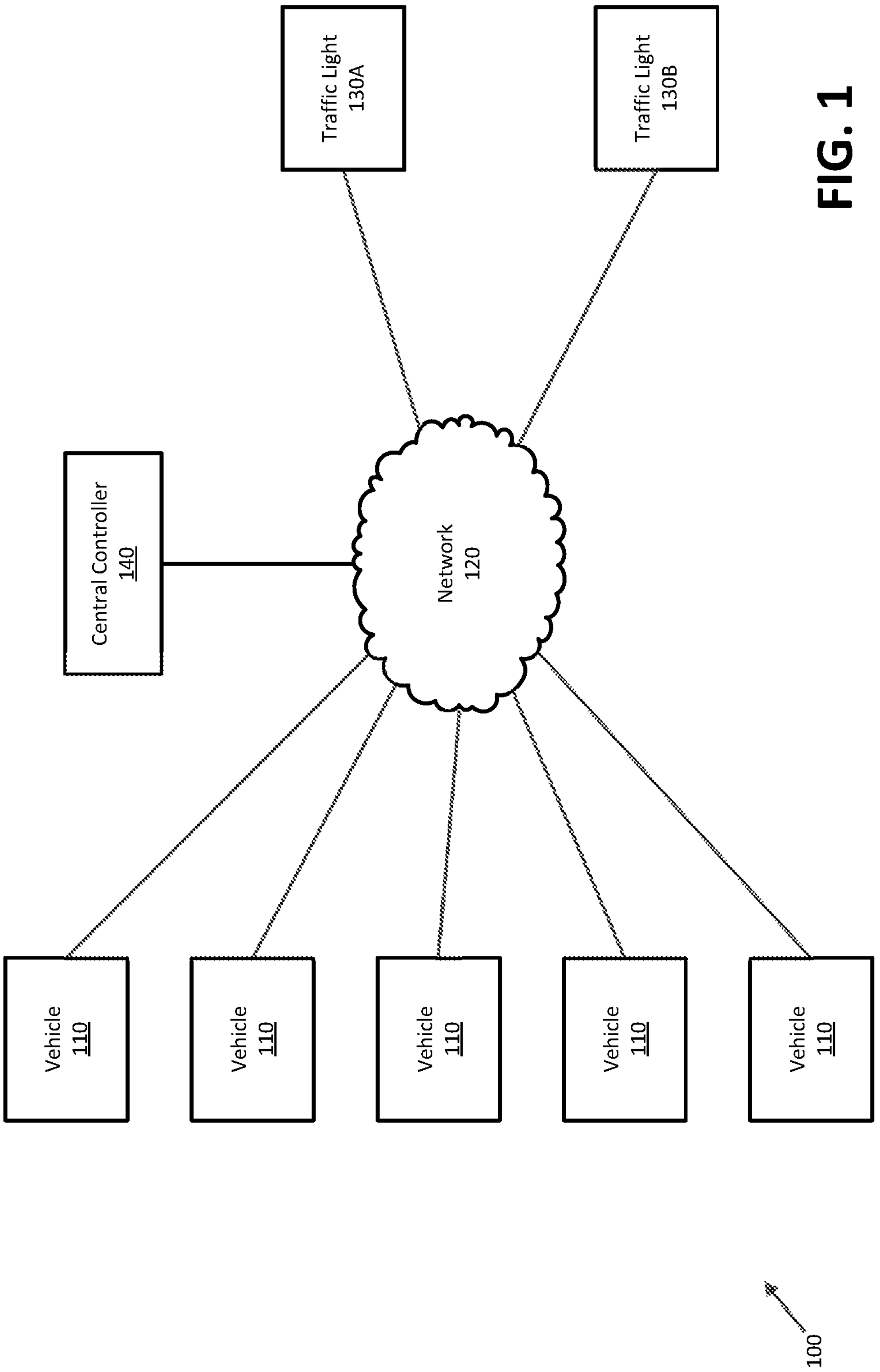
FIG. 1 is a block diagram of an exemplary system for controlling a traffic light.

FIG. 1 illustrates an exemplary traffic light control system 100. A central traffic light 130 controller 140 of comprises a processor and a memory, the memory storing instructions such that the processor is programmed for various operations, including as described herein. For example, the central controller 140 can receive data from each of a plurality of vehicles 110 proximate, i.e., within a predetermined distance, to an intersection 201 (see FIG. 2), the data indicating a kinetic energy and a time to the intersection 201 of a vehicle 110. Further, the controller 140 can optimize a timing of a traffic light 130 based on the kinetic energies and times to intersection 201, and can modify a timing of the traffic light 130 according to the optimized timing.

Optimizing traffic light timing can include minimizing an aggregate kinetic energy loss of vehicles 110 due to vehicle 110 speed changes required at the traffic light 130 when the light is yellow or red in a direction, e.g., in the direction 202. The aggregate kinetic energy loss includes the kinetic energy loss of one or more of the vehicles 110 proximate to the traffic light 130. Proximate, as the term is used herein, means within a predetermined distance or radius of, e.g., 1 kilometer, of a traffic light 130.

Exemplary System Elements

The central controller 140 is typically a computer with a processor and a memory such as are known. Further, the memory includes one or more forms of computer-readable media, and stores instructions executable by the processor for performing various operations, including as disclosed herein. The processor of the central computer 140 may include programming to receive data from traffic lights 130 and vehicles 110 via the network 120, e.g., a wired or a wireless network interface, determine optimized timing of traffic lights 130 to minimize aggregate kinetic energy loss, and send requests to traffic light(s) 130 processor to adjust timing of traffic lights 130.

The central computer 140 may receive data indicating kinetic energy from each vehicle 110. Alternatively or additionally, the central computer 140 may include programming to determine kinetic energy of a vehicle 110 based on other vehicle data, e.g., mass, speed, etc.

Each of traffic lights 130 generally include a processor and a memory, the memory including one or more forms of computer-readable media, and storing instructions executable by the processor for performing various operations, including as disclosed herein. For example, the processor of a traffic light 130 may include programming to change the light 130 at specified times or time intervals, e.g., to control a green-yellow-red cycle. Further, the light 130 can include a wired or wireless communication mechanism such is known so that the light 130 processor can execute programming to communicate via a network 120. The traffic light 130 could transmit, for example, a state (e.g., current light color, current cycle timing, etc.) to the central controller 140, and can further receive requests from the central controller 140 to adjust a light timing, e.g., a request to reduce a duration of red light for the direction 202, and to adjust light timing according to a received request from the central controller 140. Additionally, the traffic lights 130 memory may include instructions to perform operations of the central computer 140 computer as disclosed above. Alternatively, the central computer 140 may be disposed in a traffic light 130, or distributed in multiple traffic lights 130.

Vehicles 110 are typically land vehicles. The vehicle 110 may be powered in variety of known ways, e.g., with an electric motor and/or internal combustion engine. Each of the vehicles 110, generally includes one or more computing devices that include a processor, and a memory, the memory including one of more forms of computer-readable media, and storing instructions executable by the processor for performing various operations, including as disclosed herein. For example, a processor of the vehicles 110 may include programming to control propulsion (e.g., control of acceleration and deceleration in the vehicle 110 by controlling one or more of an internal combustion engine, electric motor, hybrid engine, etc.), steering, climate control, interior and/or exterior lights, etc., as well as to determine whether and when the computer, as opposed to a human operator, is to control such operations. A mode in which the computer of a vehicle 110 controls operations including propulsion, braking, and steering is referred to as an autonomous mode, versus a non-autonomous mode, in which an operator controls such operations. In a semi-autonomous mode, one or two of propulsion, braking, and steering is controlled by the vehicle 110 computer.

A computer of 110 may include or be communicatively coupled to one or more wired or wireless communications networks, e.g., via a vehicle communications bus, Controller Area Network (CAN), Ethernet, etc. Via a vehicle communications network, the computer of vehicles 110 may send and receive data to and from controllers or the like included in the vehicle 110 for monitoring and/or controlling various vehicle components, e.g., electronic control units (ECUs). As is known, an ECU can include a processor and a memory and can provide instructions to actuators to control various vehicle 110 components, e.g., ECUs can include a powertrain ECU, a brake ECU, etc. In general, the computer of vehicles 110 may transmit messages to various devices in the vehicle and/or receive messages from the various devices, e.g., controllers, actuators, sensors, etc.

Further, the computer of vehicles 110 may include programming to send vehicle data indicating mass, speed, engine volume, navigation route, distance to next intersection, etc., to the central computer 140 via the network 120.

A vehicle 110 can be what is referred to herein as compliant or non-compliant. A compliant vehicle 110 is one that will accept and execute a request from the central controller 140. A non-compliant vehicle 110 is one that will not accept, and/or will not execute, a request from a vehicle 110. A non-compliant vehicle could be one that lacks a communication interface to the controller 140, e.g., whose computer cannot communicate via the network 120 and/or lacks programming to communicate with the controller 140. Further, a non-compliant vehicle could be one which receives a request from the controller 140 but declines or does not act on the request.

As stated above, some non-compliant vehicles may not communicate via the network 120, i.e. such a non-compliant vehicle data without vehicle-to-vehicle (V2V) communication interface may not provide vehicle data like speed, geolocation, mass, etc. In one example, a traffic light 130 processor may include programming to detect non-compliant vehicles 110 without a V2V interface, and estimate vehicle data such as speed, mass, location, etc. For example, a traffic light 130 processor may be coupled to one or more sensors, e.g. camera, radar, LIDAR with field of view including an area proximate to the traffic light 130. The traffic light 130 processor may perform object detection as is known to detect vehicles 110 in the field of view of the sensors. The traffic light 130 processor can then compare the data of the detected vehicles 110, e.g. speed and location, to data received through V2V interface.

Further, based on traffic light 130 sensor data the traffic light 130 processor can identify non-compliant vehicles 110 lacking a V2V interface, e.g., by detecting a vehicle 110 in a location at which V2V data does not indicate a presence of a vehicle 110. Then the traffic light 130 processor can estimate data for detected non-compliant vehicles 110 (i.e., in this example, vehicles 110 that are detected and determined to be lacking a V2V interface) using traffic light 130 sensor data. Examples of such sensor data relating to a vehicle 110 include direction of travel, speed, and size of the vehicle.

The traffic light 130 processor may further include instructions to estimate a mass of a non-compliant vehicle 110 lacking a V2V interface based on a size and/or detected type (e.g., make and model, category such as sedan, couple, SUV, light truck, etc.) of such vehicle 110 and transmit the data to the central computer 140. Additionally or alternatively, vehicles 110 with V2V may detect non-compliant vehicles lacking a V2V interface, and can then estimate attributes such as just described of such non-compliant vehicle 110, and can then transmit the data via the network 120. For example, a first vehicle 110 with a LIDAR sensor may create a map of second vehicles 110 proximate to the first vehicle 110 and, as stated above, detect non-compliant vehicles lacking a V2V interface by comparing data from local sensors, e.g. LIDAR to data received through V2V interface indicating location of other vehicles 110. Such detection of non-compliant vehicles 110 lacking V2V by vehicles 110 with V2V or by a traffic light sensor 130 may provide vehicle data which otherwise may not be available to the central computer 140. Further, a vehicle 110 computer, may receive a request of speed adjustment from the central computer 140 to reduce speed by coasting and/or setting a new desired speed value lower than the speed of the respective vehicle 110, and adjust the speed according to the desired speed value received from the central computer 140. A speed adjustment is not necessarily a reduction of speed. The central computer 140 may alternatively minimize loss of kinetic energy by increasing speed of a vehicle 110 to enable passing a traffic light 130 during a green cycle time of the traffic light 130A.

With regard to executing a speed adjustment request from the central computer 140, a compliant vehicle 110 may follow a request to coast-down in an autonomous mode, i.e., without control of a human. For example, a vehicle 110 computer may include programming to adjust the vehicle 110 speed, e.g., the vehicle 110 computer can adjust an amount of energy provided to a drive train, e.g., one or more of electric, gasoline powered, etc., of the vehicle 110 to reach a desired speed requested by the central computer 140. Alternatively, the vehicle 110 computer could transmit a message to another ECU of the vehicle 110 to adjust the speed, e.g., the vehicle 110 computer could send a message including a new desired speed value over a vehicle communication network to a powertrain ECU. The powertrain ECU could then, e.g., in a known manner, adjust an amount of airflow and/or injected fuel in an internal combustion engine, and/or a transmission gear state of the vehicle 110 to reach the desired speed.

It is also possible that a human operator could accept a speed adjustment request, e.g., shown on an in-vehicle display, by providing input such as pressing physical or virtual button, e.g., a profile setting in Ford Sync® system or the like. A vehicle 110 computer could detect such user input and then transmit a message via the network 120 to the central computer 140 confirming an acceptance of the speed adjustment request. The human operator could then manually adjust vehicle 110 speed, e.g. by adjusting pressure on a gas pedal.

In a semi-autonomous vehicle 110, i.e., one where one of propulsion (e.g., throttle), steering, and braking is controlled by a vehicle 110 computer, confirmation and adjustment of vehicle 110 speed may be implemented by the vehicle 110 computer. For example, in a semi-autonomous vehicle 110, speed of the vehicle 110 may be controlled by a Cruise Control ECU based on a preset desired speed, while a human operator steers the vehicle 110 manually. Upon receiving of a speed adjustment request from the central computer 140, the vehicle 110 computer may automatically adjust the preset speed of Cruise Control ECU according to the requested speed adjustment of the central computer 140, while other operations of the vehicle 110, e.g., steering, remain controlled by a human operator.

Figure 2:
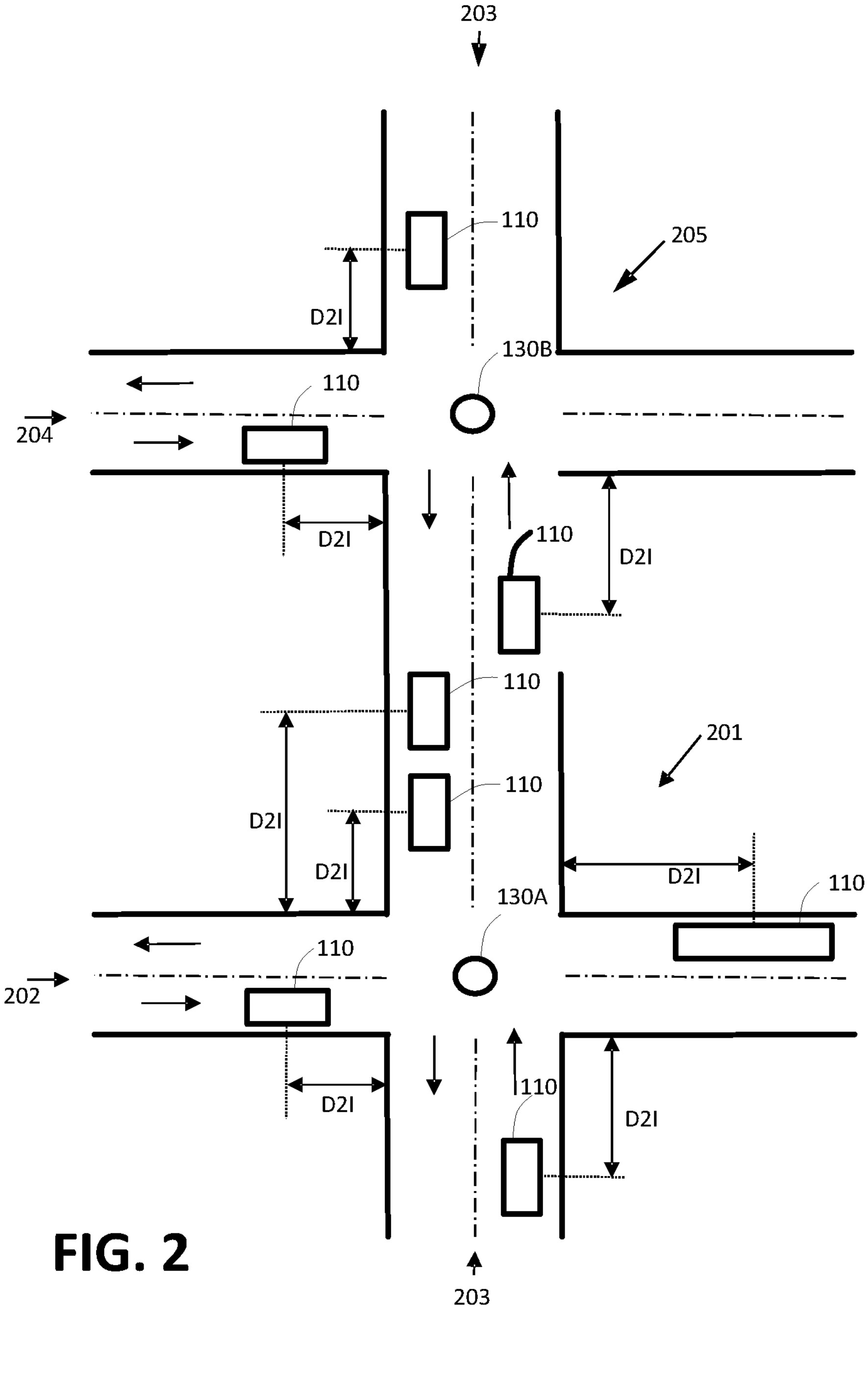
FIG. 2 is a diagram showing vehicles and traffic lights in the context of the system of FIG. 1.

FIG. 2 illustrates multiple vehicles 110, intersections 201, 205 with traffic lights 130. Moving vehicles 110 possess kinetic energy, which is gained during acceleration of vehicles 110. Various forms of energy, e.g. electrical energy stored in a battery of an electric vehicle 110, or chemical energy stored in fuel of a vehicle 110 with combustion engine, may be used to accelerate vehicle 110. The energy is usually converted to torque applied to one or more vehicle 100 wheel. Kinetic energy of a vehicle 110 changes when vehicle 110 speed changes.

An amount of kinetic energy of the vehicle 110 relates to the vehicle 110 speed. When a speed of a vehicle 110 decreases, kinetic energy of the vehicle 110 decreases, in other words, an amount of kinetic energy may be lost, i.e., changes to a form that cannot be reused to move the vehicle 110. This loss of kinetic energy may be in different forms, e.g. heat generated at brake pads of the respective vehicle 110 due to a friction between a brake pad and a surface, e.g. a rotating disk. The loss of kinetic energy may lead to a lower fuel efficiency.

Each time a red traffic light 130 causes a vehicle 110 to slow down or stop, kinetic energy of that vehicle 110 may be partially or fully lost. After the traffic light 130 changes to green, the vehicle 110 may use additional energy, e.g., supplied by fuel, to accelerate. Reducing number of times a vehicle 110 during a route is caused to brake, and reducing an amount of brake (i.e., kinetic) energy, may advantageously reduce fuel consumption.

Reducing speed of a vehicle 110 without braking is referred to herein as a "coast down." During a coast down speed of a vehicle 110 may be reduced by reducing or ceasing supply of energy to a vehicle 110 drive train, e.g. reducing fuel injected to an internal combustion engine. Vehicle 110 speed may then decrease during coast down due to aerodynamic friction of vehicle 110 body and other frictions like friction between internal parts of a vehicle 110 drivetrain, road friction, etc., that are always present independent of the braking state of the vehicle 110. Reduction of kinetic energy during a coast down, i.e., loss of fuel efficiency, may not be significant compared to a reduction of kinetic energy due to applying brakes, because when a brake is unapplied frictions, as mentioned above, are typically present and affecting operation of a vehicle 110. As mentioned above, other kinds of speed adjustment requests are possible, e.g., via braking or acceleration.

The central computer 140 takes aggregate kinetic energy, i.e., pertaining to a plurality of vehicles 110, into account when optimizing traffic light 130 timing. As an example, with reference to FIG. 2, five vehicles 110 are proximate to the intersection 201 that includes the traffic light 130A. Proximity of vehicles 110 to an intersection 201 may be determined based on a distance to intersection (D2I) of a respective vehicle. For example, a memory in a light 130 may store a geolocation of the light 130 and/or of the intersection 201. Further, received data can indicate a geolocation of a vehicle 110, and/or a time to intersection can be determined based on a geolocation and speed of the vehicle 110.

In the example of FIG. 2, three vehicles 110 are traveling in a direction 203 and two vehicles 110 are traveling in a direction 202. For purposes of this illustration, assume that all five vehicles 110 have a same speed, four of the vehicles 110 are similar sedans having a same mass, and a vehicle 110 traveling in the direction 202 is a large truck having a mass several times larger than a sedan. The central computer 140 may determine that the aggregate kinetic energy of vehicles 110 traveling in the direction 202 proximate to the intersection 201 is greater than the aggregate kinetic energy of vehicles 110 on the direction 203 proximate the intersection 201. In other words, the central computer 140 may adjust timing of traffic light 130 to give priority to (i.e., maintain a green state of the light 130 in) the direction 202 rather than the direction 203. In this example, it is shown that loss of kinetic energy in an intersection depends not only on a number of vehicles 110 on each direction but also on their respective masses. Moreover, the controller could request the large truck to coast or increase speed slightly, so that the adjustment to the light timing can be reduced. Similarly, it will be understood that speeds of vehicles 110 may affect aggregate kinetic energy amount.

With continued reference to the example above, further assume that received data from one or more vehicles 110 indicate respective vehicle 110 routes. The central computer 140 could then determine that a large vehicle 110 traveling in the direction 202 plans to turn at the intersection 201, and, therefore, may need to slow down significantly. The central computer 140 may include programming to exclude the large vehicle 110 in calculating aggregate kinetic energy loss, because that vehicle 110 may stop at the intersection 201 independent of a state of the traffic light 130A.

Process

Figure 3:
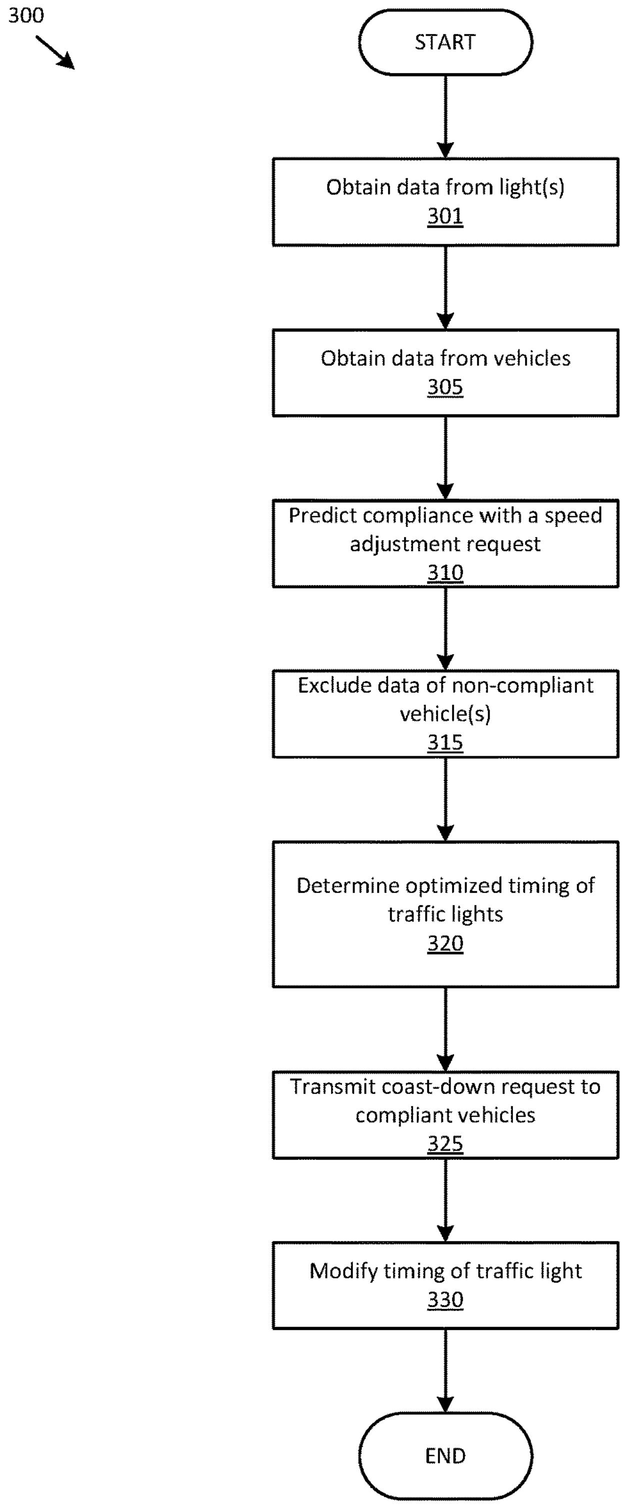
FIG. 3 is a flowchart of an exemplary process for controlling traffic lights and transmitting speed adjustment requests to one or more vehicles.

FIG. 3 illustrates a flowchart of an exemplary process 300 for controlling traffic lights 130 and transmitting speed adjustment requests to one or more vehicles 110. The process 300 may be implemented in the central computer

140 and/or in a traffic light 130 processor. In other words, programming of the central computer 140 may be fully or partially included in a memory of one or more traffic lights 130 computer and executed by respective processor(s) of traffic lights 130.

Process 300 begins in a block 301, in which the central computer 140 obtains data from traffic lights 130. As discussed above, such data may include a current state, i.e., which color is being displayed currently, planned duration of each color, overall cycle time (e.g., from red to green to yellow and back to red), and time to next change of state. As discussed above, data received from traffic lights 130 may further include data of one or more vehicles 110 that are non-compliant due to lack of a V2V interface.

Next, in a block 305, the central computer 140 receives data from vehicles 110. The data may include mass, speed, engine volume, engine efficiency, planned route, location, e.g. GPS geolocation, information indicating whether a request to adjust speed may be complied with or not, kinetic energy, and current operating mode, e.g., autonomous, non-autonomous, semi-autonomous. As stated above, non-compliant vehicles 110 without a V2V interface may be detected by vehicles 110 with V2V capability. Data received from a vehicle 110 may therefore not only include the data of the respective vehicle 110, but also may include estimated data of other vehicles 110, which are non-compliant due to lack of a V2V interface.

Next, in a block 310, the central computer 140 may predict compliance of vehicles 110 with a speed adjustment request, e.g., a coast down request. As stated above, an adjustment of speed of a vehicle 110 before reaching an intersection may avoid braking and may reduce loss of kinetic energy. In order to find an optimized timing of traffic lights 130, the central computer 140 may take into account a prediction of which vehicles 110 may comply with a speed adjustment request, as mentioned above. Further, while an adjustment request could be a request other than a coast down request, e.g., for braking or acceleration of a vehicle 110.

The prediction of the block 310 may rely on various information and various techniques. One or more of below described exemplary information and techniques may be used to predict compliance of vehicles 110.

As a first example, the central computer 140 may include programming to communicate with vehicles 110 processors and ask whether a speed adjustment request during this route will be accepted. Prediction of compliance may include levels like: "high" for a vehicle 110 responding and confirming to accept a request, "low" for a vehicle 110 declining the request, and "medium" for a vehicle 110 not responding. Alternatively, prediction of compliance could be made for vehicles 110 responding affirmatively, otherwise a vehicle 110, regardless of whether it responded, could be considered non-compliant. In any case, the computer 140 may be programmed to assume that vehicles 110 deemed highly likely to be compliant will follow instructions concerning a speed adjustment, whereas vehicle 110 given a low rating will maintain a speed or otherwise operate regarding of a speed adjustment request. A medium or other rating could be used to indicate a vehicle 110 will not follow a request, or to weight consideration given to the vehicle 110 in optimizing timing of the traffic light 130.

As a second example, the computer 140 may take into account other information, such as a vehicle 110 operating mode. For example, a likelihood of compliance of a vehicle 110 determined to be an autonomous vehicle 110 could be deemed high, whereas a likelihood of a compliance of a non-autonomous vehicle could be deemed low. V2V communications could indicate which vehicles 110 are autonomous and which are non-autonomous.

As a third example, the computer 140 could rely on historical data of vehicles 110 to predict whether a speed adjustment request may be accepted, i.e., whether a vehicle 110 has previously complied with speed adjustment requests. For example, the central computer 140 may predict a compliance level based on a compliance history of a vehicle 110 for a certain amount of time, e.g., the last 30 days. In this example, a vehicle 110 which accepted speed adjustment requests less than 25% of the time in the last 30 days could be deemed to have a "low" level of compliance. Compliance levels "medium" and "high" could respectively be assigned to vehicles 110 complying with speed adjustment requests 26%-75% and 76%-100% of the time in the predetermined time window, e.g., 30 days. Alternatively or additionally, prediction of compliance in shared vehicles 110 may be dependent on a user historical data rather than vehicle 110 history, e.g., user compliance in two or more shared vehicles 110.

Accordingly, example output of the block 310 may be respective predicted compliance levels for one or more vehicles 110 proximate to the intersection, e.g., "low", "medium", or "high". Alternatively, a compliance prediction could be provided as a percentage value.

Further, the block 310 could be omitted, i.e., the process 300 could be executed without a consideration of possible compliance to speed adjustments in minimizing an aggregate loss of kinetic energy.

Next, in a block 315, the central computer 140 may include programming to exclude non-compliant vehicles 110 from speed adjustment determinations of next steps, i.e. create a list of vehicles 110 which shall be considered by next steps of process 300 for speed adjustment request. As one example, vehicles 110 with a compliance prediction above a predetermined threshold may be considered for a speed adjustment request, e.g., based on determinations made in the block 310, vehicles 110 with compliance predictions of "medium" or "high" may be included in the list. Alternatively, vehicles 110 with compliance prediction of "medium" may be included but weighted to a lower level, e.g., considering half of the potential kinetic energy loss of "medium" compliant vehicles.

Next, in a block 320, the central computer 140 may include programming to determine optimized timing of traffic lights 130, e.g., using optimization techniques such as are known. Inputs to optimize traffic light 130 timing can include data such as described above from a traffic light 130, the vehicles 110, and determinations relating to predicted compliance of vehicles 110 and kinetic energy calculations as described above. Block 320 may optimize timing of traffic lights 130 to minimize loss of kinetic energy of vehicles 110 proximate to an intersection and/or increase the fuel efficiency of vehicles 110. The block 320 may further include the information indicating which vehicles 110 may accept a speed adjustment request. A process 400 is described below with respect to FIG. 4 for determination of optimized timing of traffic lights 130.

Next, in a block 325, the central computer 140 may transmit speed adjustment messages to one or more vehicles 110 deemed to be compliant. A speed adjustment value may be specific to each vehicle 110 depending on current speed, distance D2I of the respective vehicle 110 from an intersection, and timing of a traffic light 130 at the intersection the respective vehicle 110 is proximate to, and other information. A compliant vehicle 110 may receive the request 110 via the network 120 and adjust the speed accordingly, as described above. Additionally, after receiving a speed adjustment request at a vehicle 110, a vehicle 110 computer may respond to the central computer 140 by accepting the request.

In another example, the block 325 may be skipped, i.e., the central computer 140 could optimize timing of traffic lights 130 without adjusting speed of compliant vehicles.

Next, in a block 330, the central computer 140 may modify timing of traffic lights 130 according to results of the block 320.

Following the block 330, the process 300 ends.

Figure 4:
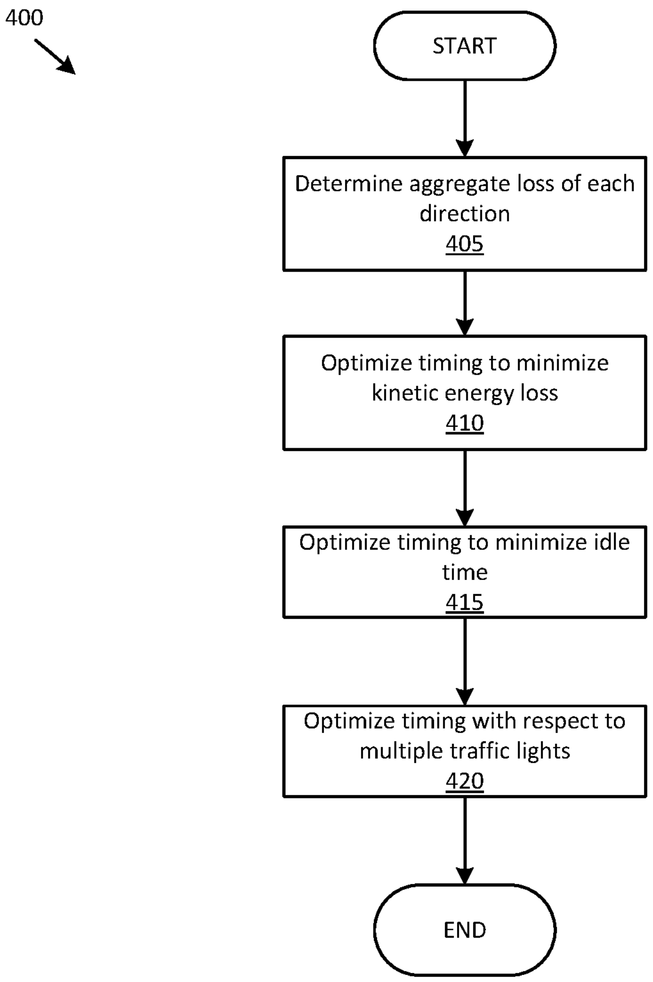
FIG. 4 is a flowchart of an exemplary process for optimization of traffic light timing.

FIG. 4 illustrates the details of an exemplary process 400 for determination of optimized timing of traffic lights 130, e.g., as mentioned above concerning the block 320 of the process 300.

The process 400 begins with a block 405, in which the central computer 140 determines an aggregate loss of kinetic energy for each direction of an intersection 201. The block 405 may include programming to take into account route information of one or more vehicles 110, as discussed above. For example, as explained above, a loss of kinetic energy of a vehicle 110 proximate to the intersection 201 that plans to turn at the intersection 201 may be excluded form an optimization of traffic light 130A timing. As another example, loss of kinetic energy of non-compliant vehicle may be excluded from consideration, or considered with a lower weight, e.g. 50%.

Next, in a block 410, the central computer 140 optimizes timing of the traffic light 130A to minimize the aggregate kinetic energy loss.

Next, in a block 415, the central computer 140 optimizes timing of traffic lights 130 with regard to duration of stop time of vehicles 110 at red traffic lights 130. Typically, vehicles 110 engines run in idle mode and consume fuel while waiting at a red light traffic light 130 for changing to green. Reducing such wait time may reduce an amount of fuel a vehicle 110 consumes during a route, i.e. increase fuel efficiency. Optimization of timing may reduce an amount of wait time.

Next, in a block 420, the central computer 140 optimizes timing with respect to multiple traffic lights 130. The block 420 may include programming to take into account an effect of timing adjustment of one traffic light 130 on another traffic light 130. For example, with reference to the traffic light 130B of FIG. 2, adjusting a timing thereof may affect an aggregate kinetic energy at traffic light 130A. In this example, the central computer 140 may optimize timing of the traffic lights 130A and 130B taking into account the effect of a timing adjustment of one light 130 on another.

The central computer 140 may further take into account route information of vehicles 110 with regard to traffic light 130 timing optimization. For example, a vehicle 110 proximate to the intersection 205 plans to pass traffic light 130B and then continue in the direction 203 and pass the traffic light 130A. An increase of green time at traffic light 130A in direction 203 may enable the vehicles 110 proximate to the intersection 201 to pass the traffic light 130A and avoid loss of the kinetic energy thereof, however may have the disadvantage of increasing a likelihood that the vehicle 110 proximate to the intersection 205 traveling toward the intersection 201 caused to stop at the red light of the traffic light 130A. In such an example, the block 320 may take into account this vehicle 110 in addition to vehicles 110 proximate to the intersection 201 to adjust the timing of the traffic light 130A.

Following the block 420, the process 400 ends.

Computing devices such as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in stored in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:

receiving data from each of a plurality of vehicles proximate to an intersection indicating a kinetic energy and a time to the intersection;

determining an optimized timing of a traffic light based on an aggregation of the kinetic energies and times to intersection;

modifying a timing of the traffic light according to the optimized timing;

predicting, for a vehicle in the plurality of vehicles, a likelihood of compliance with a speed adjustment request; and transmitting, based on the modified timing, the speed adjustment request to a vehicle determined to have the likelihood of compliance at or above a predetermined threshold.

2. The method of claim 1, wherein modifying the traffic light timing includes at least one of adjusting a red traffic light time and adjusting a green traffic light time.

3. The method of claim 1, further comprising transmitting, based on the modified timing, a coast-down request to one or more vehicles of the plurality of vehicles.

4. The method of claim 1, wherein the speed-adjustment request is a coast-down request.

5. The method of claim 1, wherein the speed-adjustment request is a request to increase speed.

6. The method of claim 1, further comprising:

predicting, for a vehicle in the plurality of vehicles, non-compliance with the speed adjustment request; and excluding data from the non-compliant vehicle from the determination of optimized timing.

7. The method of claim 1, wherein determining the optimized timing includes determining a potential of kinetic energy loss based on a current timing of the traffic light.

8. The method of claim 1, wherein the received data from one or more of the vehicles includes a planned route.

9. The method of claim 1, wherein the received data from one or more of the vehicles includes at least two of a vehicle mass, speed, and engine volume.

10. A system, comprising a computer including a processor and a memory, the memory storing instructions executable by the processor to:

receive data from each of a plurality of vehicles proximate to an intersection indicating a kinetic energy and a time to the intersection;

determine an optimized timing of a traffic light based on an aggregation of the kinetic energies and times to intersection;

modify a timing of the traffic light according to the optimized timing;

predict, for a vehicle in the plurality of vehicles, a likelihood of compliance with a speed adjustment request; and transmit, based on the modified timing, the speed adjustment request to a vehicle determined to have the likelihood of compliance at or above a predetermined threshold.

11. The system of claim 10, the instructions to modify the timing of the traffic light timing including instructions to adjust at least one of a red traffic light time and a green traffic light time.

12. The system of claim 10, the instructions further comprising instructions to transmit, based on the modified timing, a coast-down request to one or more vehicles of the plurality of vehicles.

13. The system of claim 10, wherein the speed-adjustment request is a coast-down request.

14. The system of claim 10, wherein the speed-adjustment request is a request to increase speed.

15. The system of claim 10, the instructions further comprising instructions to:

predict, for a vehicle in the plurality of vehicles, non-compliance with the speed adjustment request; and exclude data from the non-compliant vehicle from the determination of optimized timing.

16. The system of claim 10, the instructions to determine the optimized timing including instructions to determine a potential of kinetic energy loss based on a current timing of the traffic light.

17. The system of claim 10, wherein the received data from one or more of the vehicles includes a planned route.

18. The system of claim 10, wherein the received data from one or more of the vehicles includes at least two of a vehicle mass, speed, and engine volume.

* * * * *